Sept. 11, 1962     W. SHOCKLEY     3,053,635
METHOD OF GROWING SILICON CARBIDE CRYSTALS
Filed Sept. 26, 1960
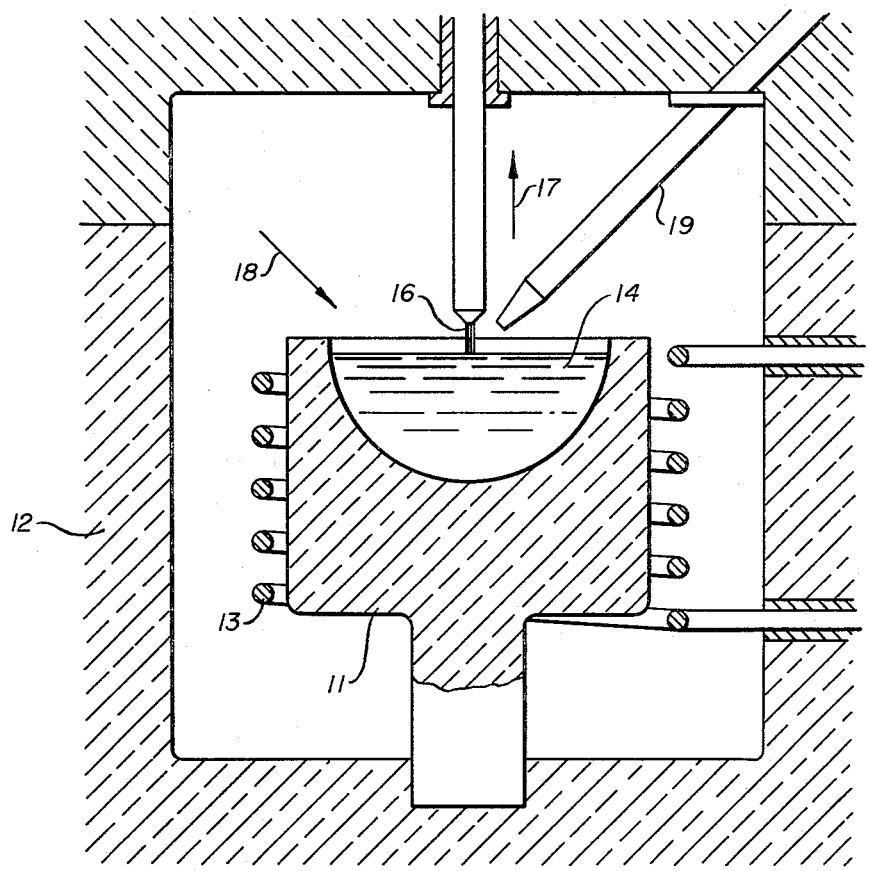
WILLIAM SHOCKLEY
INVENTOR
BY *Flehr and Swain*
ATTORNEY / # 3,053,635
METHOD OF GROWING SILICON CARBIDE CRYSTALS
William Shockley, Los Altos, Calif., assignor to Clevite Corporation, Cleveland, Ohio, a corporation of Ohio
Filed Sept. 26, 1960, Ser. No. 58,308
17 Claims. (Cl. 23—208)

This invention relates generally to a method of growing silicon carbide crystals, and more particularly to a method of growing silicon carbide crystals from a molten metal or alloy containing silicon and carbon in solution therewith.

It is a general object of the present invention to provide a method for growing silicon carbide crystals.

It is another object of the present invention to provide a method of growing silicon carbide crystals having relatively high purity.

It is a further object of the present invention to provide a method for growing silicon carbide crystals at a temperature which is substantially below the melting temperature of silicon carbide.

It is still a further object of the present invention to provide a method of growing silicon carbide crystals from a molten metal or alloy containing silicon and carbon in solution therewith.

It is still a further object of the present invention to provide a method for growing silicon carbide crystals having predetermined doping impurities therein to give material having predetermined carrier concentrations.

These and other objects of the invention will become more clearly apparent from the following description taken in conjunction with the accompanying drawing.

The drawing schematically shows apparatus suitable for carrying out the invention.

As is well known, the energy of the silicon carbon bond is very great, being quoted as being approximately equal to the energy of the carbon carbon bond. These energies are considerably higher than that of the silicon silicon bond. The method of growing silicon carbide crystals according to this invention relies upon these differences in bonding energy.

According to the invention, a molten metal or alloy has in solution therewith carbon and silicon to form a liquid metal or alloy solvent. The concentration of carbon and silicon being such that at a predetermined temperature the concentration of silicon carbide is at saturation. A small localized region of the solution is then cooled. This region is then supersaturated with silicon carbide and the silicon carbide can be precipitated in crystalline form from the solution. The temperature in a small region may be lowered by inserting a silicon carbide seed into the solution. The localized region adjacent the seed is supersaturated and silicon carbide deposits on the seed in crystalline form. The seed and crystal forming thereon may be continuously withdrawn from the solution as silicon and carbon are continuously added to maintain the proper concentration of silicon carbide in the solution.

The metal or alloy solvent is selected so that it forms a molten (liquid) bath which dissolves an appreciable quantity of silicon carbide without any vaporization of the metal or alloy at said temperature. The solubility of silicon carbide in the molten bath should increase with temperature; preferably there should be a large solubility dependence on temperature. The solution process should be reversible whereby a lowering of the temperature supersaturates the solution with silicon carbide. Preferably, a large temperature difference should exist between saturation and spontaneous nucleation of silicon carbide in order to permit growth of a single crystal from a cooled zone.

Referring to the drawing, a graphite crucible 11 is placed in an oven 12 and heated by an induction heater 13. The molten pool 14 may comprise an iron and silicon solution which is in contact with the graphite crucible whereby the solution becomes saturated with carbon. The solubility of silicon in a carbon saturated molten iron solution increases from an atomic fraction of 0.355 at 1420° C. to 0.376 at 1700° C. (Table 8, page 448 of Journal Acta Metallurgica, vol. 2, May 1954, Chipman et al.). As a consequence of this increase in the solubility of silicon with increased temperature, it is evident that at higher temperatures more silicon may be added without causing supersaturation. However, if a seed 16 is lowered into the molten solution, a localized region will be cooled. This region of the solution is super-saturated with silicon carbide. If the seed 16 is silicon carbide, silicon carbide will crystallize onto the seed rather than silicon since the silicon carbon bond has higher energy than the silicon silicon bond. The crystal may be continuously withdrawn as indicated by the arrow 17. To maintain the concentration of silicon in the remainder of the molten solution, silicon may be added by well known techniques as indicated by the arrow 18. Thus, it is seen that iron is a metal which has the characteristics set forth above.

In order to avoid the precipitation of graphite crystals, it is advantageous to approach the condition of super-saturation from silicon rich solutions on the phase diagram. For this reason, it may be advantageous to use not a graphite crucible but a silicon carbide crucible, or even an inert crucible and to add extra silicon to the solution.

Alternately, the changing saturation concentration of carbon with temperature may be employed to effect the growth of a silicon carbide crystal. The solubility of graphite in an alloy containing approximately 0.35 atomic fraction of silicon increases from about 1.05 atomic percent at 1420° C. to nearly 2.2 atomic percent at 1700° C. (Table 7, same authors). Thus, it is seen that the solubility of the carbon increases with increasing temperature. When a crystal is lowered into the solution, silicon carbide is precipitated onto the crystal. The crystal may then be withdrawn and carbon added in the manner previously described.

In general, it is seen that the solubility of silicon carbide increases in the iron with increasing temperature. By maintaining a fixed concentration at a higher temperature of either silicon or carbon and producing a localized cold spot in the solution, a supersaturated region is formed. Silicon carbide crystal may be precipitated from this region of the solution.

The silicon carbide crystal is grown at temperatures, 1420–1700° C., substantially below the melting point of silicon carbide. The strength of the carbon silicon bond in the silicon carbide will cause the crystals to reject vigorously atoms which are not of the right size to fit into the crystal lattice of the silicon carbide crystal. This effect is known to be pronounced for silicon and germanium crystals which are characterized by segregation factors when grown from a melt of the order of $10^{-4}$ to $10^{-6}$. (The segregation factors measure the relative solubility of an impurity in the liquid as compared to the crystal.) These segregation factors hold for silicon and germanium at the melting point. The rejection would presumably be even stronger if the crystal were grown from a solution which allowed it to be grown at temperatures below the melting temperature.

Conventional methods of doping the silicon carbide crystals in the melt can be employed by utilizing atoms of suitable size factors. For example, nitrogen and phosphorous atoms as donors and boron and aluminum atoms as acceptors will be more suitable in silicon carbide than atoms coming farther along in the periodic table. These elements may be used to make n-type and p-type silicon carbide. Since the radius of the carbon and silicon atoms are quite different, substitutional impurities from the third and fifth colums of the periodic table will have preferential substitutional positions on one or the other of the carbon and silicon sites depending upon the atomic radii and electronegativity values. Their roles as donors and acceptors are, however, independent of site at which they find themselves even though the ionization energies differ somewhat.

It is evident that a variety of molten metals and alloys may be used as solvents. Several atomic percent of carbon is soluble in copper at 1800° C. and silicon is completely miscible. Over 10 atomic percent of carbon is soluble in nickel at 1600° C., and again silicon is completely miscible. Aluminum, aluminum-zinc alloy, manganese, cobalt, bismuth and tin are a few others which have the desired characteristics. It is a general consequence of the thermodynamics of these systems that the solubility of silicon carbide will increase with increasing temperature. The solution process is reversible. The relative strength of the silicon silicon, carbon carbon and silicon carbon bonds lead to the previously described behavior in these metal solutions.

For example, copper may be used as the solvent metal for the purpose of growing silicon carbide crystals. The solubility of carbon and coper varies from the order of one atomic percent at 1600° C. to three atomic percent at 1900° C., Table I. Silicon is highly soluble in copper and in fact lowers its melting point. Thus, it is relatively easy to produce a solution saturated with silicon carbide from which the silicon carbide crystal may then be grown as previously described.

As previously described, various of the metals may be exploited for the purpose of growing silicon carbide. The advantage of one compared to another being associated with such factors as their suitability for adding doping elements and to the degree that the atoms of the metal solvents themselves contribute beneficially or adversely to the crystal as grown.

A tube 19 may be provided for directing a cooling jet of inert gas towards a portion of the melt to produce a cold region whereby the solution is supersaturated. The jet may also serve to stir the solution in the vicinity of the crystal so that the crystal may be withdrawn without disturbance due to latent heat.

In a continuous process graphite, silicon rods or silicon carbide rods may be continually fed into the melt to maintain the proper concentration. An electric current may be passed through the rod as it is inserted into the melt whereby the temperature is maintained near that of the melt. The rod then has negligible effect upon the temperature of the melt. Further, surface tension of the molten solution will not prevent mixing of the added material.

It is apparent that different apparatus may be employed for carrying out the invention. The apparatus shown is illustrative only.

Thus, it is seen that a method of growing silicon carbide crystals has been described. The crystals are grown from a metal or alloy solution at temperatures substantially below the melting point of silicon carbide. The crystals have a high purity. Suitable doping elements are easily added.

This application is a continuation-in-part of the copending application, Serial No. 648,889, filed March 27, 1957, entitled "Method of Growing Silicon Carbide Crystals," now abandoned.

I claim:
1. The method of growing silicon carbide crystals which comprises forming a bath of carbon and silicon dissolved in a molten solvent which dissolves an appreciable quantity of silicon carbide at a temperature below the solvent's vaporization temperature and which has an increasing solubility of silicon carbide with increasing temperature with the solubility process being reversible, maintaining said bath at a molten temperature, adjusting the concentration of the carbon and silicon at said temperature until the bath is at a saturation point for silicon carbide, inserting a silicon carbide crystal seed into said molten bath, and withdrawing the seed from the bath, said seed serving to cool a surrounding portion of the bath to form a portion which is supersaturated with silicon carbide whereby silicon carbide precipitates on said seed as it is withdrawn from the solution.

2. A method as claimed in claim 1 in which said molten bath is formed in a silicon carbide crucible.

3. The method of growing silicon carbide crystals which comprises melting a solvent which dissolves an appreciable quantity of silicon carbide at a temperature below the solvent's vaporization temperature and which has an increasing solubility of silicon carbide with increasing temperature with the solution process being reversible in a graphite crucible to form a molten bath of the solvent saturated with carbon, maintaining said bath at a molten temperature, adding silicon to said molten bath to saturate said bath with silicon carbide at said molten temperature, inserting a silicon carbide crystal seed into said molten bath, and withdrawing the seed from the bath, said seed serving to cool a surrounding portion of the bath to form a portion which is supersaturated with silicon carbide whereby silicon carbide precipitates on said seed as it is withdrawn from the bath.

4. The method of growing silicon carbide crystals which comprises forming a molten bath of carbon and silicon dissolved in a molten solvent which dissolves an appreciable quantity of silicon carbide at a temperature below the solvent's vaporization temperature and has an increasing solubility of silicon carbide with increasing temperature with the solution process being reversible, maintaining said bath at a molten temperature, adjusting the concentration of the carbon and silicon at said temperature until the bath is at a saturation point for silicon carbide, inserting a silicon carbide crystal seed into said bath to cool a surrounding portion of said bath to form a portion which is supersaturated with silicon carbide whereby silicon carbide precipitates on said seed, withdrawing said seed from said bath together with the silicon carbide depositing thereon, and continuously adding silicon and carbon to said molten bath to compensate for that removed as silicon carbide crystal.

5. The method as in claim 4 in which said molten solvent is additionally characterized in that it has a large temperature difference between saturation and spontaneous nucleation of silicon carbide to permit growth of silicon carbide.

6. The method of growing silicon carbide crystals which comprises forming a molten bath of carbon and silicon dissolved in iron, maintaining said bath at a molten temperature, adjusting the concentration of the carbon and silicon at said temperature until the bath is at a saturation point for silicon carbide, inserting a silicon carbide crystal seed into said molten bath, and withdrawing the seed from the bath, said seed serving to cool a surrounding portion of the bath to form a portion which is supersaturated with silicon carbide whereby silicon carbide precipitates on said seed as it is withdrawn from the solution.

7. A method as in claim 6 in which said molten bath is formed in a silicon carbide crucible.

8. The method of growing silicon carbide crystals which comprises melting iron in a graphite crucible to form a molten bath of iron saturated with carbon, maintaining said bath at a molten temperature, adding silicon to said molten bath to saturate said bath with silicon carbide at said molten temperature, inserting a silicon carbide crystal seed into said molten bath, and withdrawing the seed from the bath, said seed serving to cool a surrounding portion of the bath to form a portion which is supersaturated with silicon carbide whereby silicon carbide precipitates on said seed as it is withdrawn from the bath.

9. The method of growing silicon carbide crystals which comprises forming a molten bath of carbon and silicon dissolved in iron, maintaining said bath at a molten temperature, adjusting the concentration of the carbon and silicon at said temperature until the bath is at a saturation point for silicon carbide, inserting a silicon carbide crystal seed into said bath to cool a surrounding portion of said bath to form a portion which is supersaturated with silicon carbide whereby silicon carbide precipitates on said seed, withdrawing said seed from said bath together with the silicon carbide depositing thereon, and continuously adding silicon and carbon to said molten bath to compensate for that removed as silicon carbide crystal.

10. The method of growing silicon carbide crystals which comprises forming a molten bath of carbon and silicon dissolved in copper, maintaining said bath at a molten temperature, adjusting the concentration of the carbon and silicon at said temperature until the bath is at a saturation point for silicon carbide, inserting a silicon carbide crystal seed into said molten bath, and withdrawing the seed from the bath, said seed serving to cool a surrounding portion of the bath to form a portion which is supersaturated with silicon carbide whereby silicon carbide precipitates on said seed as it is withdrawn from the solution.

11. A method as in claim 10 in which said molten bath is formed in a silicon carbide crucible.

12. The method of growing silicon carbide crystals which comprises melting copper in a graphite crucible to form a molten bath of copper saturated with carbon, maintaining said bath at a molten temperature, adding silicon to said molten bath to saturate said bath with silicon carbide at said molten temperature, inserting a silicon carbide crystal seed into said molten bath, and withdrawing the seed from the bath, said seed serving to cool a surrounding portion of the bath to form a portion which is supersaturated with silicon carbide whereby silicon carbide precipitates on said seed as it is withdrawn from the bath.

13. The method of growing silicon carbide crystals which comprises forming a molten bath of carbon and silicon dissolved in copper, maintaining said bath at a molten temperature, adjusting the concentration of the carbon and silicon at said temperature until the bath is at a saturation point for silicon carbide, inserting a silicon carbide crystal seed into said bath to cool a surrounding portion of said bath to form a portion which is supersaturated with silicon carbide whereby silicon carbide precipitates on said seed, withdrawing said seed from said bath together with the silicon carbide depositing thereon, and continuously adding silicon and carbon to said molten bath to compensate for that removed as silicon carbide crystal.

14. The method of growing silicon carbide crystals which comprises forming a molten bath of carbon and silicon dissolved in a molten solvent selected from the group consisting of iron, copper, nickel, aluminum, aluminum-zinc alloy, manganese, cobalt, bismuth and tin, maintaining said bath at a molten temperature, adjusting the concentration of the carbon and silicon at said temperature until the bath is at a saturation point for silicon carbide, inserting a silicon carbide crystal seed into said molten bath, and withdrawing the seed from the bath, said seed serving to cool a surrounding portion of the bath to form a portion which is supersaturated with silicon carbide whereby silicon carbide precipitates on said seed as it is withdrawn from the solution.

15. A method as in claim 14 in which said molten bath is formed in a silicon carbide crucible.

16. The method of growing silicon carbide crystals which comprises melting a solvent selected from the group consisting of iron, copper, nickel, aluminum, aluminum-zinc alloy, manganese, cobalt, bismuth and tin in a graphite crucible to form a bath of said solvent saturated with carbon, maintaining said bath at a molten temperature, adding silicon to said molten bath to saturate said bath with silicon carbide at said molten temperature, inserting a silicon carbide crystal seed into said molten bath, and withdrawing the seed from the bath, said seed serving to cool a surrounding portion of the bath to form a portion which is supersaturated with silicon carbide whereby silicon carbide precipitates on said seed as it is withdrawn from the bath.

17. The method of growng silicon carbide crystals which comprises forming a molten bath of carbon and silicon dissolved in a molten solvent selected from the group consisting of iron, copper, nickel, aluminum, aluminum-zinc alloy, manganese, cobalt, bismuth and tin, maintaining said bath at a molten temperature, adjusting the concentration of the carbon and silicon at said temperature until the bath is at a saturation point for silicon carbide, inserting a silicon carbide crystal seed into said bath to cool a surrounding portion of said bath to form a portion which is supersaturated with silicon carbide whereby silicon carbide precipitates on said seed, withdrawing said seed from said bath together with the silicon carbide depositing thereon, and continuously adding silicon and carbon to said molten bath to compensate for that removed as silicon carbide crystal.

References Cited in the file of this patent

UNITED STATES PATENTS

| | | |
|---|---|---|
| 2,113,354 | McKenna | Apr. 5, 1938 |
| 2,729,542 | Van Der Pyl | Jan. 3, 1956 |
| 2,851,342 | Bradshaw et al. | Sept. 9, 1958 |
| 2,854,364 | Lely | Sept. 30, 1958 |
| 2,908,553 | Frank et al. | Oct. 13, 1959 |